United States Patent [19]

Goldhaft

[11] 4,049,165
[45] Sept. 20, 1977

[54] CASE AND CLOSURE CAP FOR INSTANT MINIATURE FISHING ROD AND REEL

[76] Inventor: Morris Goldhaft, 8100 Shorefront Parkway, Rockaway Beach, N.Y. 11693

[21] Appl. No.: 648,647

[22] Filed: Jan. 12, 1976

[51] Int. Cl.² ............................................. A45F 5/00
[52] U.S. Cl. .................................... 224/5 E; 24/3 M; 43/18 R; 43/23; 206/38; 224/5 R; 224/28 A
[58] Field of Search ............. 224/5 R, 5 A, 5 B, 5 E, 224/5 F, 5 G, 26 B, 28 R, 28 A, 28 B, 28 E, 28 P; 206/38; 43/20, 22, 25, 25.2, 26, 54.5 R, 57.5 R, 23, 19; 24/3 M

[56] References Cited

U.S. PATENT DOCUMENTS

| | | | |
|---|---|---|---|
| 2,089,744 | 8/1937 | Golden | 43/19 |
| 2,110,999 | 3/1938 | Miga | 206/38 R X |
| 2,224,972 | 12/1940 | Long et al. | 224/28 R X |
| 2,655,756 | 10/1953 | Polis | 43/20 |
| 2,935,186 | 5/1930 | Clark | 224/5 R X |
| 3,180,053 | 4/1965 | Norton et al. | 43/57.5 R |
| 3,341,884 | 9/1967 | Pryor | 206/38 X |
| 3,425,150 | 2/1969 | Braese | 43/25.2 |
| 3,949,511 | 4/1976 | Goldhaft | 43/43.16 X |
| 3,968,669 | 7/1976 | Coleman | 24/3 M X |

FOREIGN PATENT DOCUMENTS

| | | | |
|---|---|---|---|
| 1,121,865 | 8/1956 | France | 42/23 |

Primary Examiner—Robert J. Spar
Assistant Examiner—Winston H. Douglas
Attorney, Agent, or Firm—Richard L. Miller

[57] ABSTRACT

A novel keyholder for holding a set of keys upon keychains, the keyholder including a case and closure cap that contains all the paraphenalia needed for a sports fisherman to go fishing and which includes a miniature collapsible fishing rod, a reel of fishing line and a collection of conventional fishing hooks, lures and keyring fish hooks that are attachable to the line, the keyholder being connected to a clip for hooking on a person's belt, or by means of a heavy bead chain with a coupling being fitted around a wrist when casting out a fishing line.

7 Claims, 9 Drawing Figures

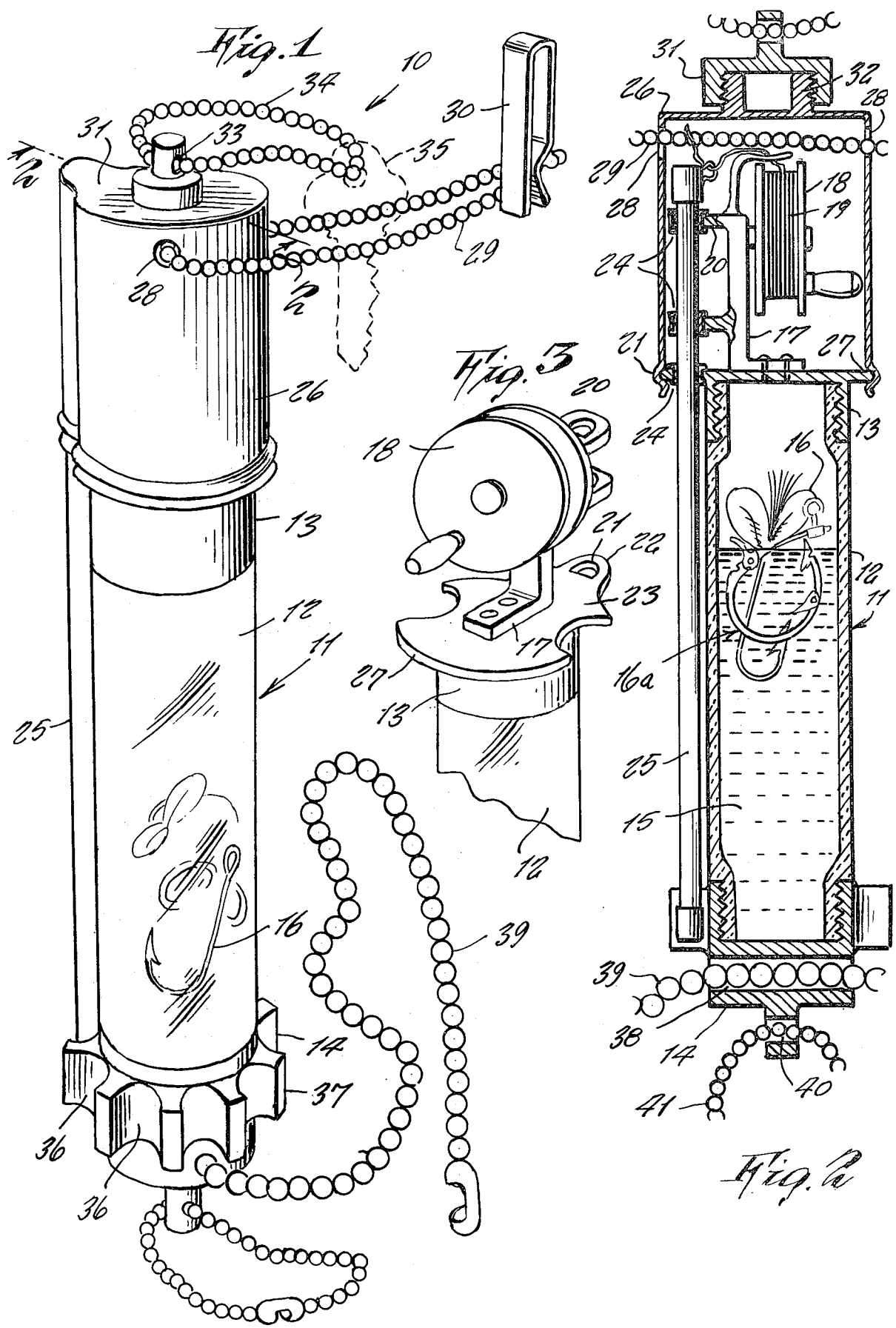

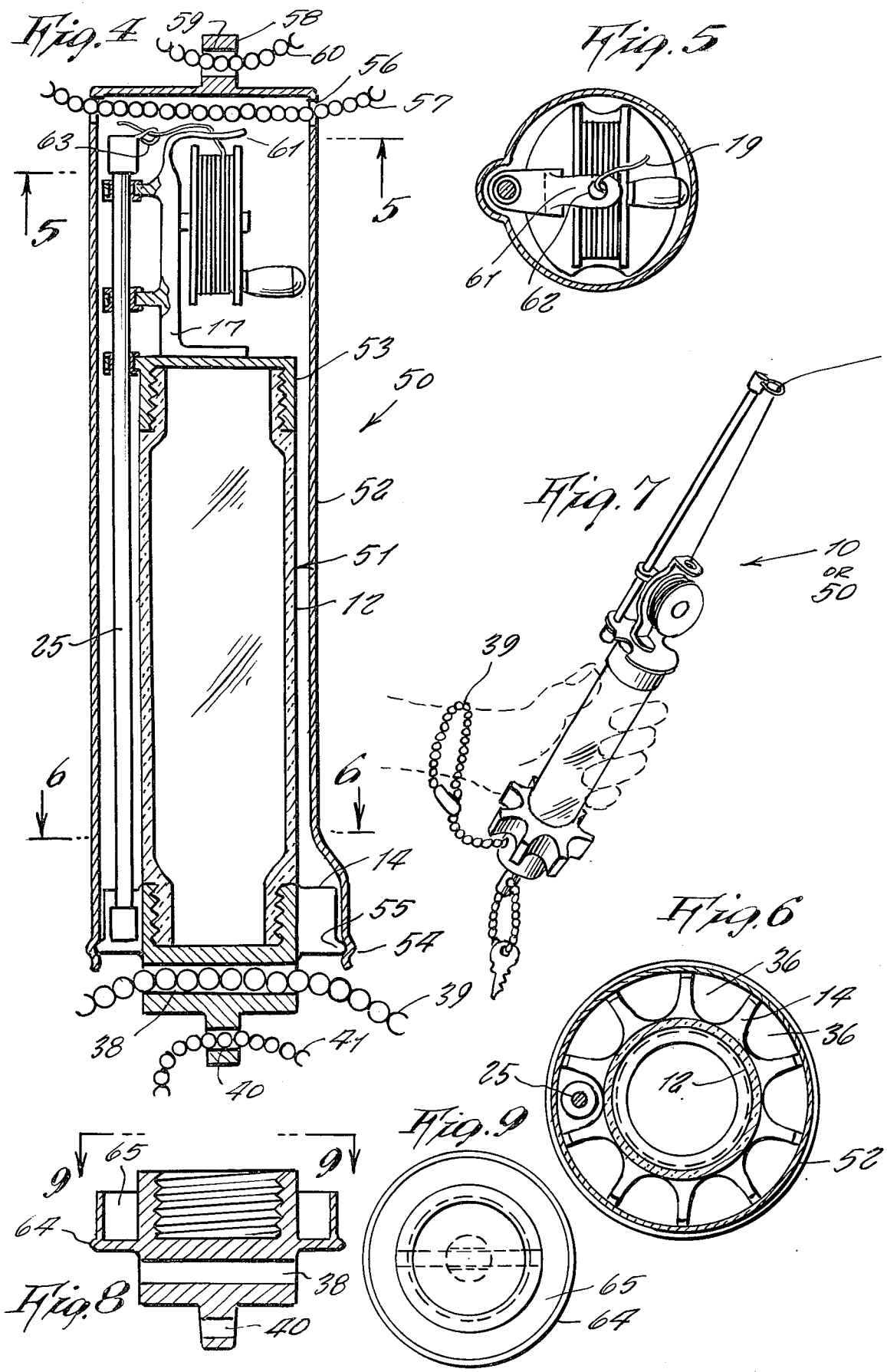

CASE AND CLOSURE CAP FOR INSTANT MINIATURE FISHING ROD AND REEL

This invention relates generally to fishing equipment for sports fisherman.

A principal object of the present invention is to provide a keyholder for holding an assortment of keys and which contains all the various items needed by a sports fisherman to go fishing, so that it is always handy in case an opportunity occurs at any time for the same.

Another object is to provide a keyholder which would be ideal for travelers so that during travel, when they come upon a river or lake that looks suitable for fishing, they have all the necessary equipment so to indulge in the same.

Another object is to provide a keyholder which includes key rings for holding house keys, car keys, and the like, the keyholder being able to be clipped to a persons belt, pocket or wrist, so to be readily available whenever wanted, and when being fastened to the wrist by an adjustable heavy bead chain having a coupling to suit a wrist size, the device is ideal for casting out a fishing line from a reel mounted on a rod.

Other objects are to provide a travel cover, for instant miniature fishing rod and reel with both conventional key rings and fish hooks which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention.

FIG. 2 is a cross section on line 2—2 of FIG. 1.

FIG. 3 is a perspective view of a reel mounted upon the case.

FIG. 4 is a view similar to FIG. 2 showing a modified design of cover.

FIG. 5 is a cross section on line 5—5 of FIG. 4.

FIG. 6 is a cross section on line 6—6 of FIG. 4.

FIG. 7 is a perspective view of the invention shown in use.

FIG. 8 is a cross section of a modified design of lower end cap.

FIG. 9 is a top view of the lower end cap as viewed on line 9—9 of FIG. 8.

Referring now to the drawings in detail, and more particularly to FIGS. 1 to 3 thereof at this time, the reference numeral 10 represents a keyholder for instant fishing according to the present invention wherein there is a cylindrical case 11 made of transparent plastic tube 12, a opaque upper end cap 13 and an opaque lower end cap 14 that are screw threaded on opposite end of the tube. Within the interior of the case, a quantity of water 15 may be placed and various fishing hooks and lures 16 may then be dropped therein. One such hook 16a comprises a novel combination keyring and fishing hook that is described in extensive detail in applicant's U.S. Pat. No. 3,949,511 issued Apr. 15, 1976.

The upper end cap 13 has a bracket 17 mounted upon it upper side, the bracket supporting a fishing reel 18 containing reeled up fishing line 19.

The bracket 17 also includes vertically aligned openings 20 which also align with a D-shaped opening 21 formed through a sidewardly projecting tab 22 of a horizontal wall 23 of the upper end cap. All three openings are fitted with friction sleeves 24 so to frictionally grasp a D-shaped fishing rod 25 slidable therein. The upper and lower ends of the rod are fitted with diametrically enlarged stops for limiting the travel of the rod sliding.

It should be noted that a collapsible, telescopic fishing rod could be optionally used.

A hollow closure cap 26 of inverted cup-shaped snap fits around the peripheral edge 27 wall 23 so to enclose the bracket, reel and the upper portion of the rod 25. The closure cap is of molded, opaque hard opposite openings 28 therethrough receiving a bead chain 29 attached to a clip 30 designed to clip either on a person's belt or an edge of a pocket.

A duo-fitting cap 31 is screw threaded upon an upward extension 32 on top of the closure cap 26, the fitting having an opening 33 receiving a bead chain 34 for holding keys 35.

The duo-fitting 31 is interchangeable with upper end cap 13, by having a same threads. This permits a fisherman to remove the fishing rod and reel, if he so desires, and still use the key holders. Thus the duo-fitting can be threaded directly to the transparent case 12.

The lower end cap 14 is cog-shaped by having peripheral notches 36 around its side 37; the lower end of the fishing rod being fitted into one of the notches when in a retracted downwardly position as shown in FIGS. 1 and 2 so that it thus prevents the cap 14 from unscrewing. A transverse opening 38 through the cap 14 receives a heavy bead chain 39 of thicker size while a transverse opening 40 therethrough receives a thinner bead chain 41, the both chains each serving as a key chain for keys, plus additionally the heavy bead chain 39, fitted with an adjustable coupling, can be used for wrist-size and safety in casting a fishing line, thus securing the fishing rod and reel.

In FIG. 4, a modified design of keyholder 50 is shown to include a case 51, fitted completely inside an elongated closure cap 52. The case 51 is practically the same as case 11 by including the same tube 12, lower end case 14, a bracket 17, reel 18 and rod 25. The upper end cap 53 is practically the same as cap 13 except that it does not include a sidewardly extending peripheral edge 27 because there is no closure cap 26 to be engaged therewith.

In this form of the invention, a lower edge 54 of the cap 52 snap fits around a peripheral bead 55 of the lower end cap 14. Openings 56 through an upper end of the cap 52 receive a beaded chain 57, and an extension 58 on an upper end of the cap 52 has an opening 59 receiving beaded key chain 60.

Thus in this design, the cap enclosed the rod 25 completely.

As shown in FIG. 5, in greater detail, the bracket 17 includes a tab 61 having hole 62 through which the line 19 from the reel extends before engaging a loop 63 on the upper end of the rod 25.

In operative use, after the top cap is removed, the rod 25 is simply pulled outwardly into an extended position as shown in FIG. 7 so that the keyholder is then in position for line casting and fishing. The peripheral edge cut-outs or notches 23 can be used for line thumbing.

In FIG. 8 and FIG. 9, a modified design of bottom end cap 64 includes an annular channel 65 into which a lower end of the rod 25 extends instead of into the above described notches. Thus the cap can be removed while the rod is in a retracted position, thus differing from the cog shaped cap 14.

Thus different designs of the invention are presented.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In a key holder for instant fishing, the combination of a cylindrical case consisting of a transparent tube having upper and lower end caps screw threaded to upper and lower ends of said tube, a quantity of water in said case and conventional fishing hooks, lures, and keyring fish hooks which are interchangeable, floating on the water; a bracket mounted upon said upper end cap supporting a reel of fishing line and a miniature fishing rod, said bracket having a pair of aligned openings which align with a D-shaped opening formed through a sideward projecting tab of said upper end cap, all three said openings being fitted with friction sleeves which frictionally grasp said fishing rod which is cross-sectionally D-shaped, said fishing rod being slidable between a retracted position alongside said case and an extended upward position, and means coupled to at least one of said end caps for holding keys.

2. The combination as set forth in claim 1 wherein said bracket reel and an upper end of said rod are enclosed under a closure cap snap fitted upon said upper end cap, a beaded chain through said closure cap being fitted with a clip for attachment to a belt or pocket.

3. The combination as set forth in claim 2 wherein said lower end cap includes a recess within which a lower end of said rod is received when in a retracted position.

4. The combination as set forth in claim 3 wherein said key holding means including beaded chains extending through openings in said lower end cap and a duo-fitting cap screwed upon an upward extension of the top of said closure end cap, and further including a heavy beaded chain extending through another opening in the lower end cap having a coupling for adjustably securing said heavy beaded chain around a wrist for being wrist-sized, so with safety permit casting a fishing line.

5. The combination as set forth in claim 4 wherein said case together with said rod and reel are entirely enclosed by said closure cap.

6. The combination as set forth in claim 5 wherein said lower end cap includes a plurality of peripheral notches, said notches provide a means to receive the fishing rod when in a retracted position, and prevents the lower cap from unscrewing.

7. The combination as set forth in claim 6 wherein said duo-fitting cap is duo-fitting by having the same screw thread as said upper end cap for interchangeable screw engagement upon an upper end of said transparent tube.

* * * * *